United States Patent
Nag et al.

(10) Patent No.: US 7,404,604 B2
(45) Date of Patent: Jul. 29, 2008

(54) TWIN RECLINER FOR AUTOMOTIVE SEATS

(75) Inventors: Bijon Nag, Kolkota (IN); Manyam Hemadri Reddy, Bangalore (IN); Muthusamy Ramalingam, Bangalore (IN); Kesavan Rajagopal, Bangalore (IN)

(73) Assignee: IFB Automotive Private Ltd., Bangalore (IN)

( * ) Notice: Subject to any disclaimer, the term of this patent is extended or adjusted under 35 U.S.C. 154(b) by 0 days.

(21) Appl. No.: 10/584,944

(22) PCT Filed: Jan. 7, 2004

(86) PCT No.: PCT/IB2004/000072

§ 371 (c)(1),
(2), (4) Date: Aug. 13, 2007

(87) PCT Pub. No.: WO2004/103764

PCT Pub. Date: Dec. 2, 2004

(65) Prior Publication Data

US 2008/0093907 A1    Apr. 24, 2008

(51) Int. Cl.
*B60N 2/02* (2006.01)

(52) U.S. Cl. ..................... 297/367
(58) Field of Classification Search .......... 297/367, 297/368, 366
See application file for complete search history.

(56) References Cited

U.S. PATENT DOCUMENTS

| | | | |
|---|---|---|---|
| 6,092,874 A * | 7/2000 | Kojima et al. ............ | 297/367 |
| 6,142,569 A | 11/2000 | Kidokoro et al. | |
| 6,880,887 B2 * | 4/2005 | Hoshihara et al. ........... | 297/367 |
| 7,021,715 B2 * | 4/2006 | Umezaki .................... | 297/367 |
| 7,093,901 B2 * | 8/2006 | Yamada ..................... | 297/367 |
| 7,334,843 B2 * | 2/2008 | Yamada et al. .............. | 297/367 |
| 2003/0085603 A1 | 5/2003 | Lee et al. | |
| 2003/0227206 A1 | 12/2003 | Choi | |

FOREIGN PATENT DOCUMENTS

| EP | 0 952 031 A2 | 10/1999 |
|---|---|---|
| EP | 1 068 986 A2 | 1/2001 |

* cited by examiner

*Primary Examiner*—Anthony D Barfield
(74) *Attorney, Agent, or Firm*—Birch, Stewart, Kolasch & Birch, LLP

(57) ABSTRACT

A twin recliner operable manually for permitting selective position of a seat back with respect to the seat cushion through a range of reclined positions to a selected use position. Said twin recliner comprising: a master and a slave recliner, a shaft arm member with a longitudinal cleavage on one side and a plurality of peripheral stepping arrangement on the other side, an external spring means with one end hooked to the lower portion of the activating lever and the other end locked to the longitudinal cleavage of the shaft to facilitate a nominal return rate of the actuating lever, a rotatable cam mounted on the third of said plurality of stepping arrangement having a projection is engaged with the slot of the lower housing to receive a rotary drive directly from the actuating lever to disengage inner sectors, a guiding plate with a central passage mounted on the fourth of the stepping arrangement of the shaft member to provide a synchronized movement of the inner sectors.

5 Claims, 8 Drawing Sheets

TWIN RECLINER FOR AUTOMOTIVE SEATS

TECHNICAL FIELD

The present invention is in field of automotive seat recliners. The present invention particularly relates to a twin recliner operable manually for permitting selective position of a seat back with respect to the seat cushion through a range of reclined positions to a selected use position.

DESCRIPTION OF THE BACKGROUND ART

All vehicles are now equipped with seats having a recliner mechanism that can be selectively actuated for permitting the angular position of the seat back to be varied with respect to the seat cushion.

Generally, seat reclining mechanism includes a lower and upper arm mounted on the seat cushion and seat back respectively, to house a locking cum unlocking means, which is effected by a rotatable cam operated by a splined shaft which passes through the lower and upper arms of the recliner. Spiral springs that are mounted on the shaft, are disposed between the two arms of the recliner to apply radial forces on the cam for rotation during locking and unlocking operations.

U.S. Pat. No. 6,626,495 discloses a seat recliner mechanism having a manual control member on a shaft hinge for actuating a cam which in turn helps in disengagement of the first toothed pawls or inner sector member, with the second toothed seat back arm member to allow pivotal movement of the seat back arm which is connected to the seat back to a reclined position.

In the aforementioned seat reclining device, the actuating mechanism includes a hinge shaft directly connected to the cam. The cam is also hooked with the spiral spring. As a result there are two forces acting on the actuating member i.e., the cam. Sometimes, this may result in uneven forces acting on the cam and hence operational difficulties arise as well as increasing the operating effort. The guide walls that guide the pawls or the inner sectors may wear out due to irregular shape and manufacturing process.

The recliner also becomes safety critical mechanism because in the event of a collision the recliner should be able to withstand the impact forces that act on the seat and thus on the recliner, without any major deformations or breakage. The necessity of twin recliner becomes significant when the seat size is increased such that a single recliner fails to endure the subjected loads. Thereby the concept wherein the two recliners share both static and fatigue loads forms an important background of this invention.

U.S. Pat. No. 6,474,740,issued Nov. 5, 2002 and U.S. Pat. No. 6,609,756,issued Aug. 26, 2003,also specifies a reclining device similar to the above mentioned claiming to have reduced rotational friction and noise respectively.

The constraints that limit the functioning of the twin recliner assembly include failure of recliners to operate simultaneously due to loss in transmission, very high operating forces, teeth breakage because of shock forces, slippage due to undershooting and overshooting, endurance failure, so on and so forth.

In the present trend it is desirable to provide a recliner with the simplest mechanism with high strength, less friction between the components and thus free movement of the components for operational ease.

Thus the objective of this invention has been to enhance the operating characteristics of a twin recliner assembly by fulfilling the load carrying and fatigue life requirements and also by reducing the loss in the actuating mechanism between the master and the slave recliners. Further the objective has been to reduce the operating effort and provide a recliner assembly which is designed so as to eliminate the problems in the individual assembly also. It is therefore desirable to have an improved recliner which is easy to both manufacture and operate and is failsafe.

SUMMARY OF THE INVENTION

The present invention provides a twin recliner for a seat, which permits the reclining of the seat back with respect to the seat cushion. The recliner, which includes master (door side) and slave recliner assemblies and individual components or the sub-assemblies for the slave and the master (door side) recliners, are mirror image parts. The master and the slave recliner assemblies are at the transition of seat back and the seat cushion at each side of the seat. Only the master recliner has an actuating hand lever operating directly the rotatable cam, and a connecting rod connected to the master recliner transmits the motion to the slave recliner and facilitates the disengagement and/or engagement of the mating parts.

BRIEF DESCRIPTION OF THE ACCOMPANYING DIAGRAMS

DETAILED DESCRIPTION OF THE INVENTION

Referring initially to FIGS. 1-5, an embodiment wherein a twin recliner for automotive seat assembly, according to one embodiment includes a master 1 and a slave recliner 2 suitably connected by means of a connecting rod R (not shown in FIG. 3) are secured to either side ends of the seat assembly. The master recliner having a lower housing H (not mentioned)is mounted onto the seat cushion assembly C, an upper housing L (not mentioned) is mounted onto the seat back assembly, which forms the moving member of the recliner to transmit motion about a hinge on the lower housing H. The lower housing H (not shown) and upper housing L are disposed in an overlapping manner.

Figure 1:
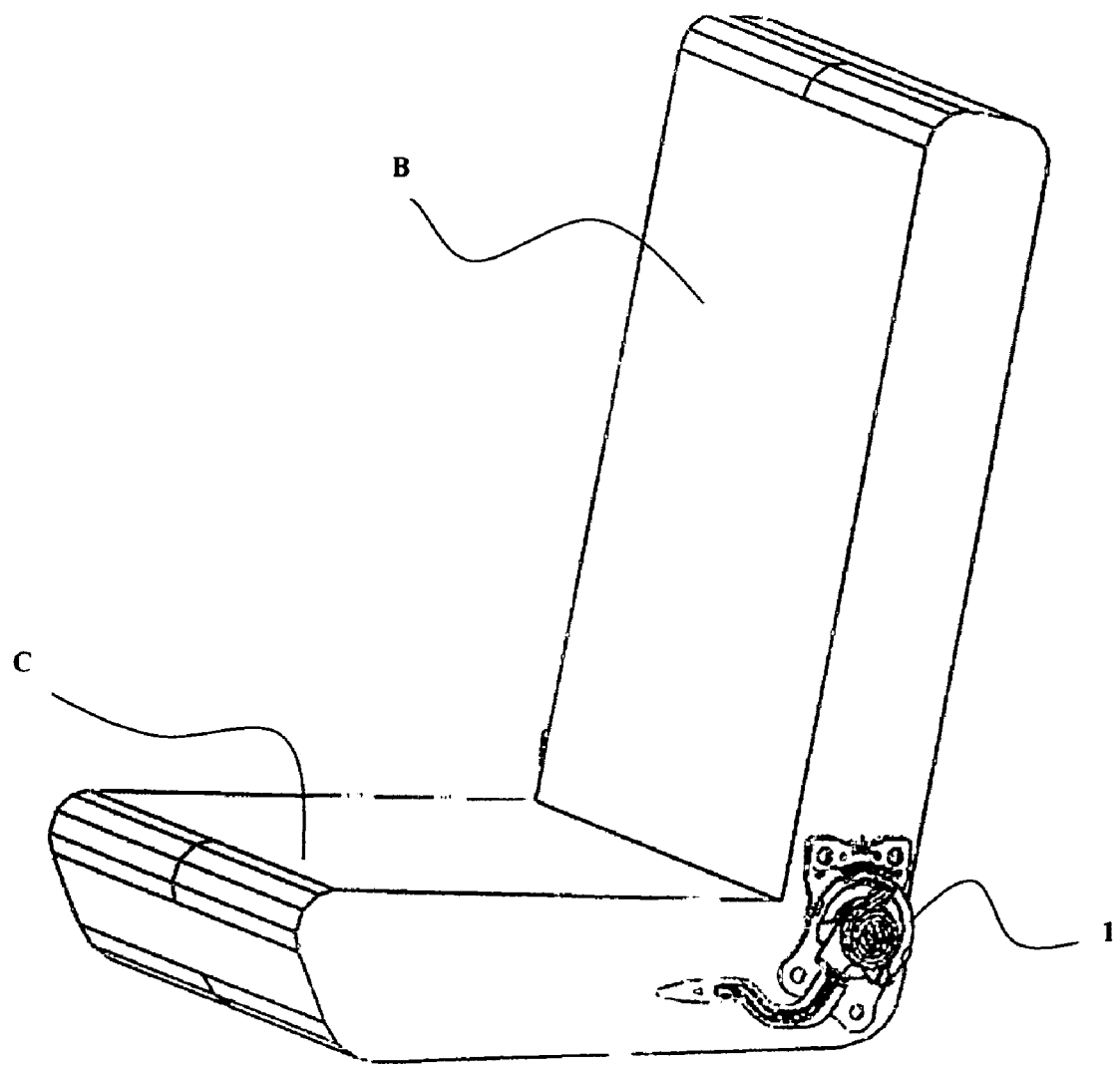
FIG. 1 is a side view of the master recliner with lever mounted on the seat assembly.
Figure 2:
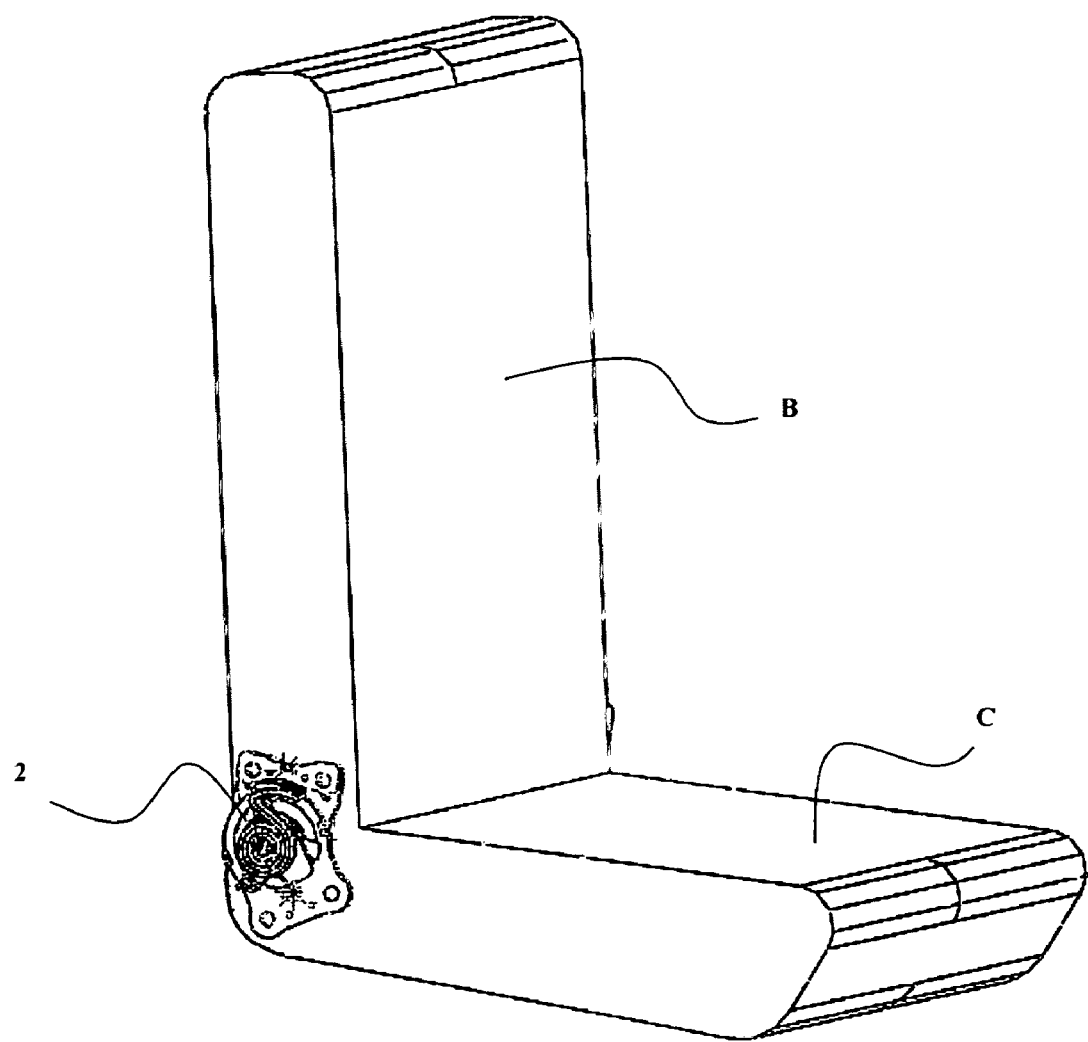
FIG. 2 is a side view of the slave recliner without a lever.
Figure 3:
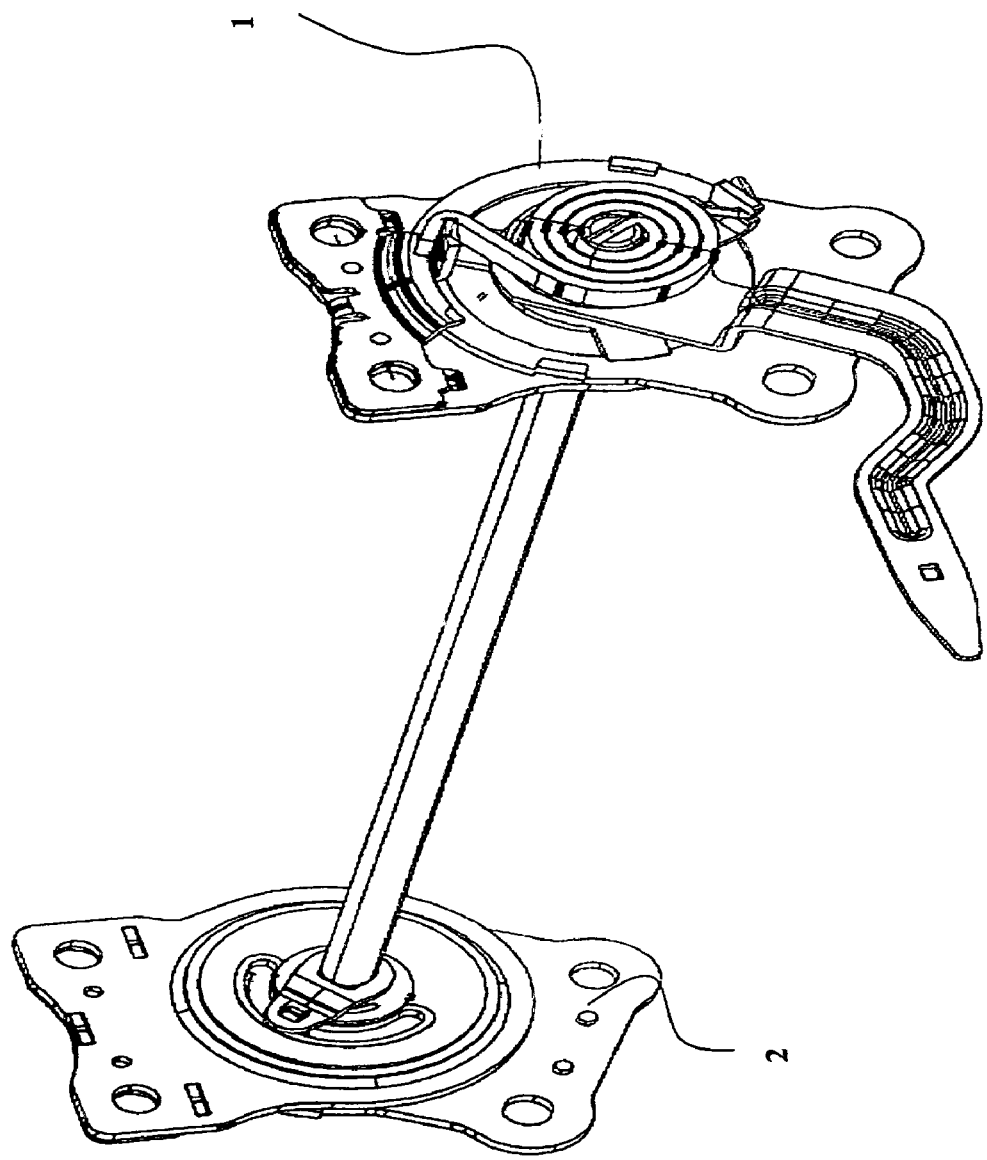
FIG. 3 depicts twin recliner assembly in the locked condition along with a connecting means between the Master and the Slave recliner.

Now referring to FIG. 3, another embodiment wherein the master recliner 1 is connected to the slave recliner 2 by means of a rotatable connecting rod R (Not shown), having a bracket N, (the connecting bracket on the master side is not shown in this figure) which also has a corresponding rotary movement. The connecting rod R transmits a reciprocating rotary movement of the master recliner 1 to the slave recliner 2 while in operation.

Figure 4:
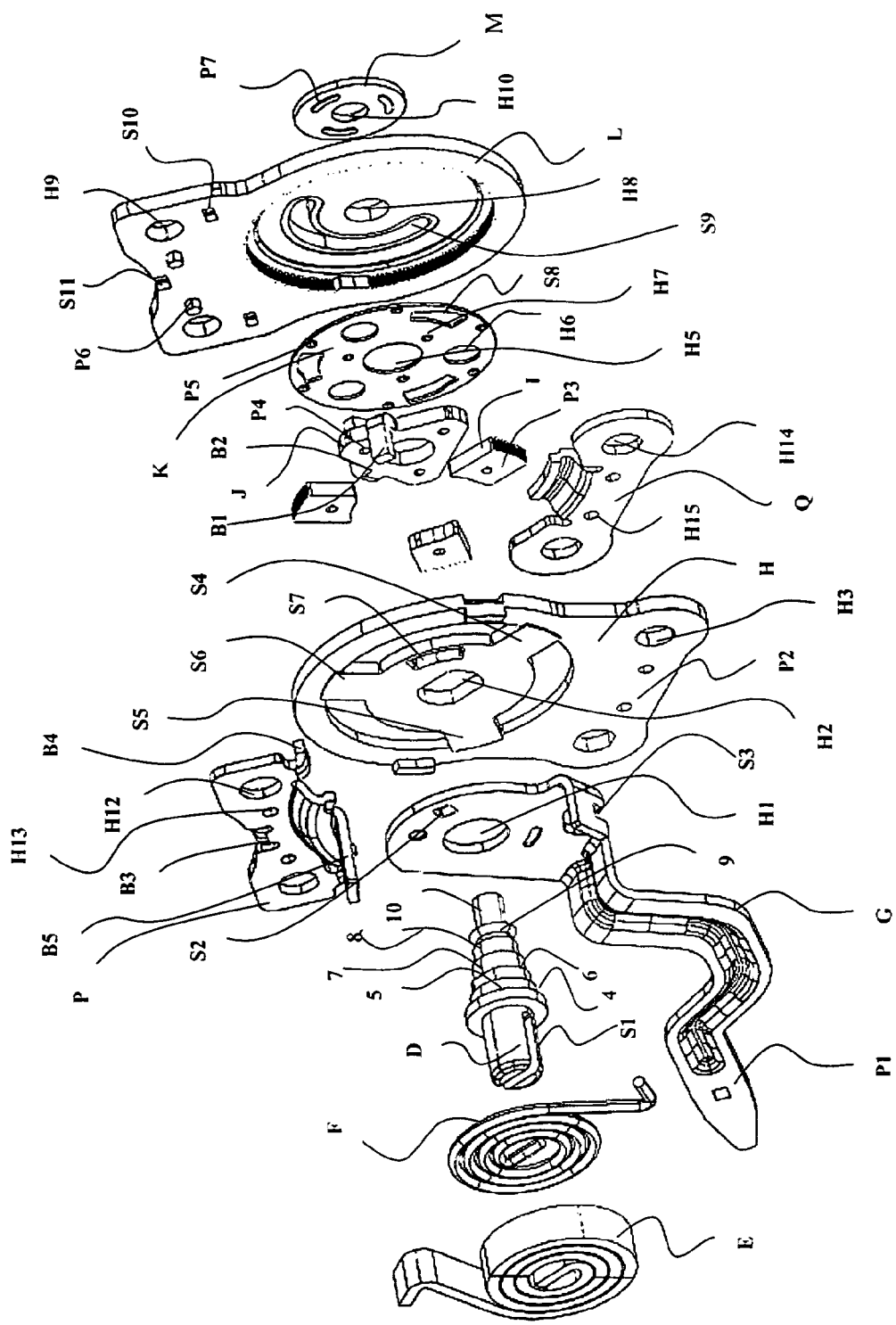
FIG. 4 is an exploded view of the twin recliner assembly.

As illustrated in FIG. 4, another embodiment wherein the master recliner 1 includes a non-rotatable shaft arm D, axially positioned between the lower housing H, and the upper housing L. The shaft arm D is sliced at one end to provide a longitudinal cleavage S1. The other end of the non-rotatable shaft arm D has a plurality of stepping arrangements 4, 5, 6, 7, 8, 9 and 10 on its circumference to provide space for assembly of various components of the master recliner 1.

Figure 6:
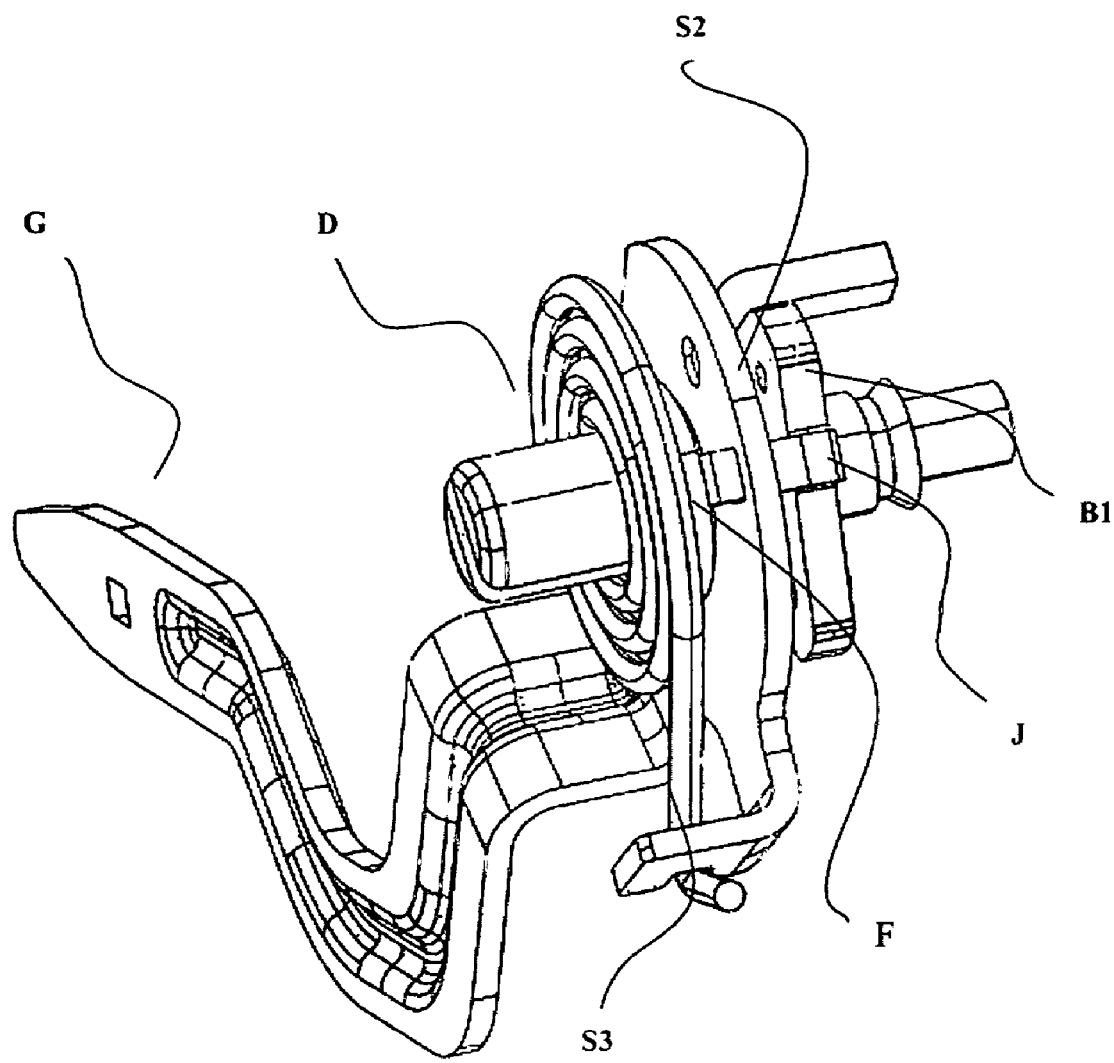
FIG. 6 is an expanded view of the lever release with an external spring means to directly operate the rotatable cam, including the lever release, cam, spring lever and the shaft arm.

Now, a combined reference is made to FIGS. 4 and 6, wherein the movable lever release G having a circular slot H1 is mounted on step 5 of the shaft arm D. A lower housing H having a rectangular central passage is mounted on the step 6 of the shaft arm D. An upper supporting plate P is mounted on top surface of lower housing H having a projection B5 extending towards the lever release G. A spring return E, which is a torsion spring that facilitates a nominal return rate of the seat back B once it is released is mounted on to the riveting slot S1 provided on the shaft arm D and the other end of the spring return E is hooked to the bend B5 provided on the upper support plate P.

The spring lever F is a torsion spring that facilitates a nominal return rate of the lever release G once it is released is mounted on riveting slot S1 provided on the shaft arm D and the other end of the spring lever F is hooked to the slot S3 provided on the lever release G of the master recliner 1.

The spring assembly comprising spring lever F that is hooked to the lever release G in the area outside the inner assembly of the recliner is directly connected to rotatable cam J. Thus the rotatable cam J is subjected to a single force enhancing operation and minimizing the operating effort.

The presence of the said spring lever F is important and its stiffness should be optimum such that the operating effort is tangible and the release lever springs back to its position. Similarly, the presence of the said spring return E is very critical and it's torque should be optimum such that the force required to push the arm recliner to position is ample and the return rate of the arm recliner is safe.

The upper support plate P mounted on the lower housing H acts as a supporting member and is attached to the upper housing L. The upper support plate P helps in hooking spring return E. The projections B3 and B4 and a pair of openings H13 help in locating the upper support plate P and the pair openings H12 helps in mounting the upper support plate P on to the upper housing L.

Figure 7:
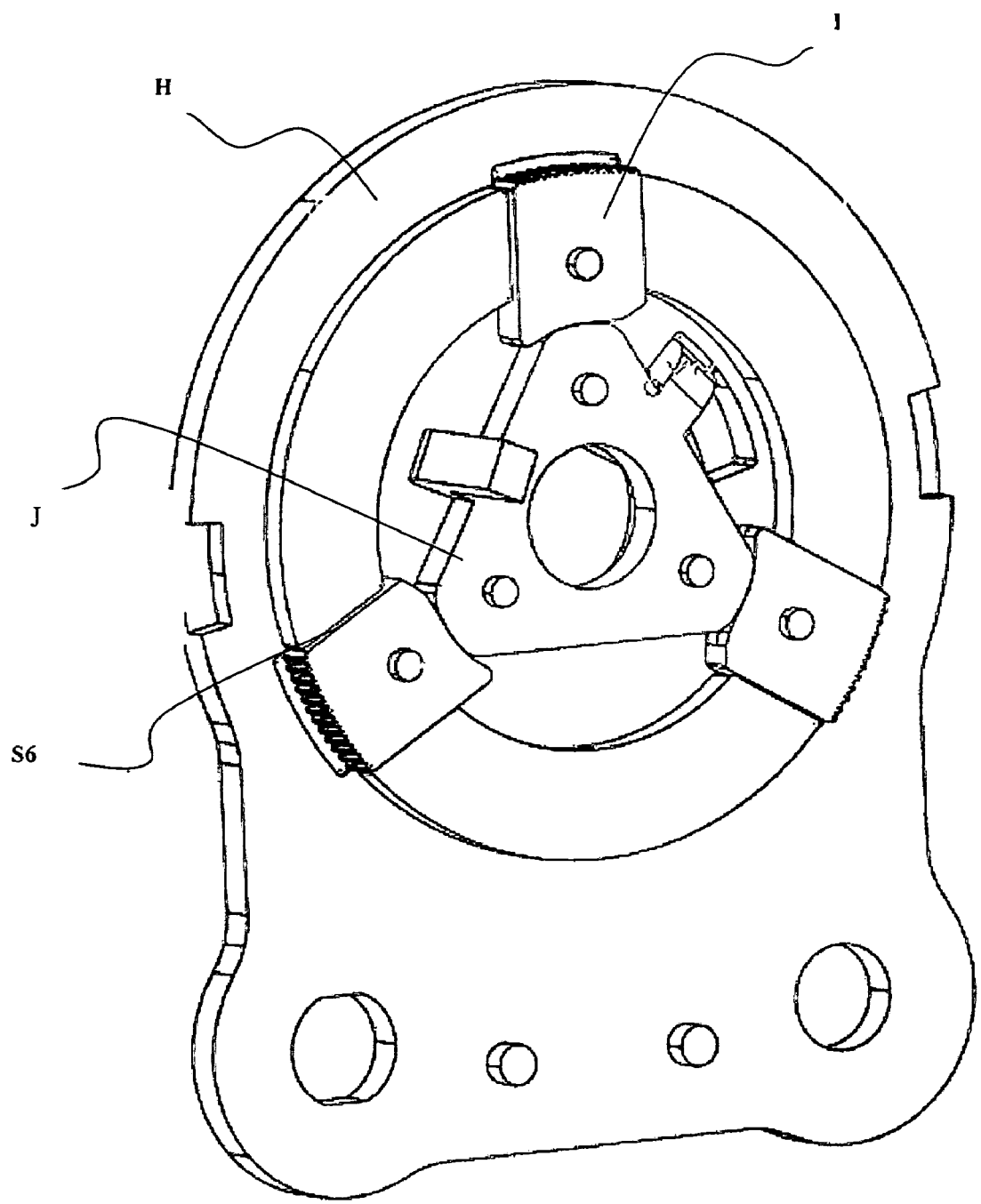
FIG. 7 depicts the slots in the lower part for guiding the inner sectors and the actuation of the inner sectors by the cam.
Figure 8:
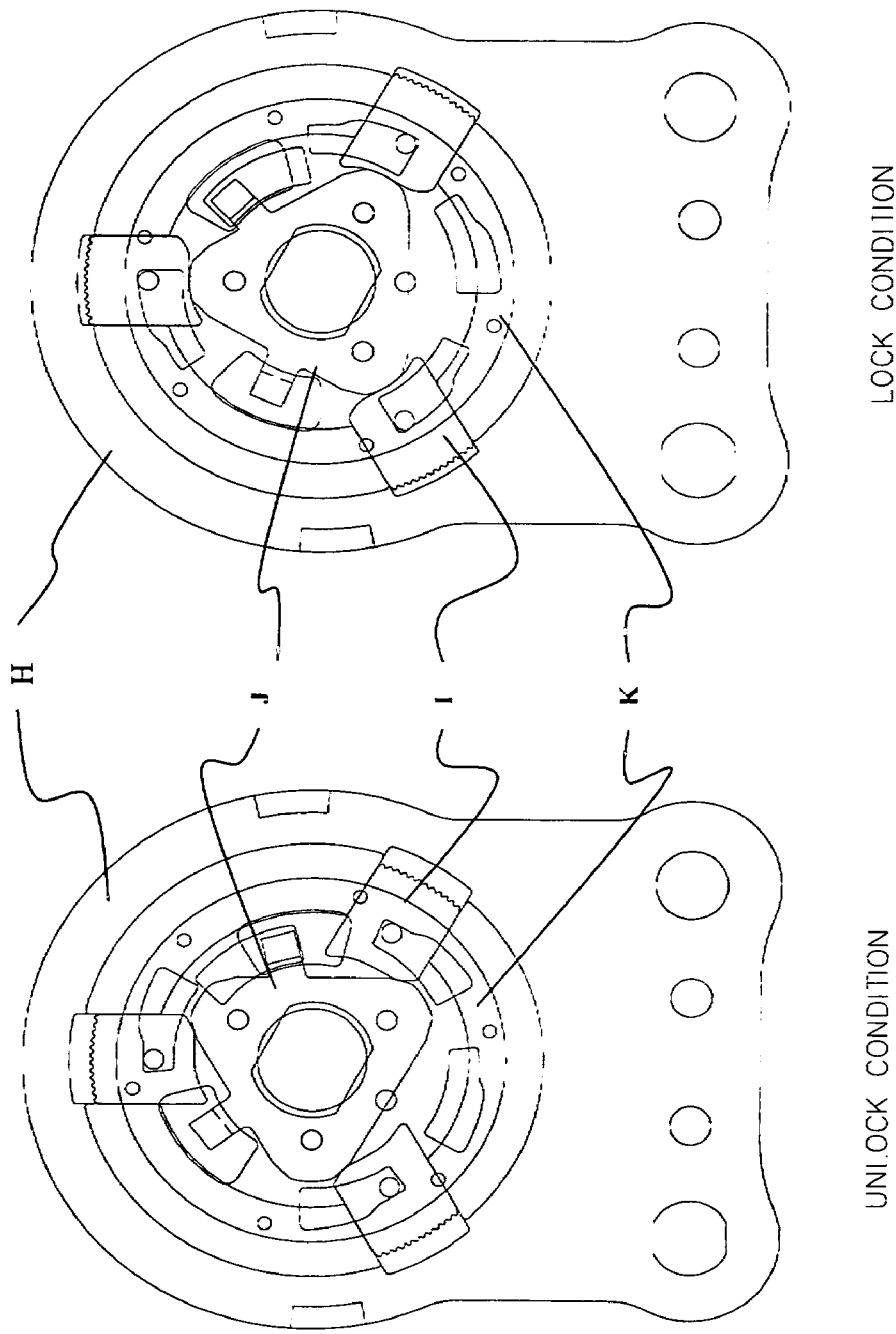
FIG. 8 depicts the movement of inner sectors during lock and unlock positions.

Now by referring to FIGS. 4 and 7, according to another embodiment of the present invention, said lower housing H, having a rectangular central opening H2 is assembled on step 6 of the shaft arm member D to form a housing for the plurality of inner sectors I, a rotatable cam plate J, and guide plate K. The inner sectors I1, I2 and I3 having a gear profile on the upper side are disposed in the recesses S4, S5 and S6 that are suitably carved out of the inner surface of the lower housing H to provide fore and aft movement of the sectors during operation. The recesses are further suitably designed to prevent any lateral movement of the inner sectors I while in operation. The inner sectors I are the components which help in locking and unlocking of the recliner assembly. They are disposed with an intervening angle of 120 degrees to each other. The recesses S4, S5 and S6 of the lower housing H for guiding the inner sectors I1, I2 and I3 are push throughs wherein the flatness of the inner surface is maintained for free movement of the inner sectors while under operation.

Further, a rotatable cam J having a circular passage H16 is mounted on step 7 of the shaft arm D is housed in the lower housing H, said cam having a projection B1 on its periphery. A slot S7 is provided on the lower housing H to allow the projection B1 of the cam J to pass through slot S7 axially. The projection B1 is further extended to the slot S2 of the lever release G. A pair of openings H3 of the lower housing H is used to mount the lower support plate Q. The guide plate K having circular central opening H5 is mounted on the stepping arrangement 7 of the shaft arm D.

The upper housing L also acts as a mounting member for the recliner assembly which has to be mounted on the seat back B (FIG. 1), with the help of openings H9. The push throughs P6 and slots S10 and S11 helps for location of the upper support plate P. Hole H8 helps in mounting of the upper part onto the shaft arm D. Slot S9 guides the bend B2 of the cam plate J.

The gear profile carved out on the inner surface of the upper housing L meshes or unmeshes with the sectors I_ having gear profile for unlocking and locking of the recliner assembly. Another projection B2 on the surface of the cam J facing towards the upper housing L passes through the opening H6 on the guide plate K and the semi-circular slot S9 on the upper housing L. The projection further connects connecting bracket N (FIG. 5).

The push through P3 disposes the inner sectors into the guide plate K. The guide plate K is provided to have better control on the synchronized movement of the inner sector I.

The gear profile of the inner sectors help in to and fro movement for engaging and disengaging the gear profile of the upper housing L and thus locking and unlocking the recliner assembly.

Figure 5:
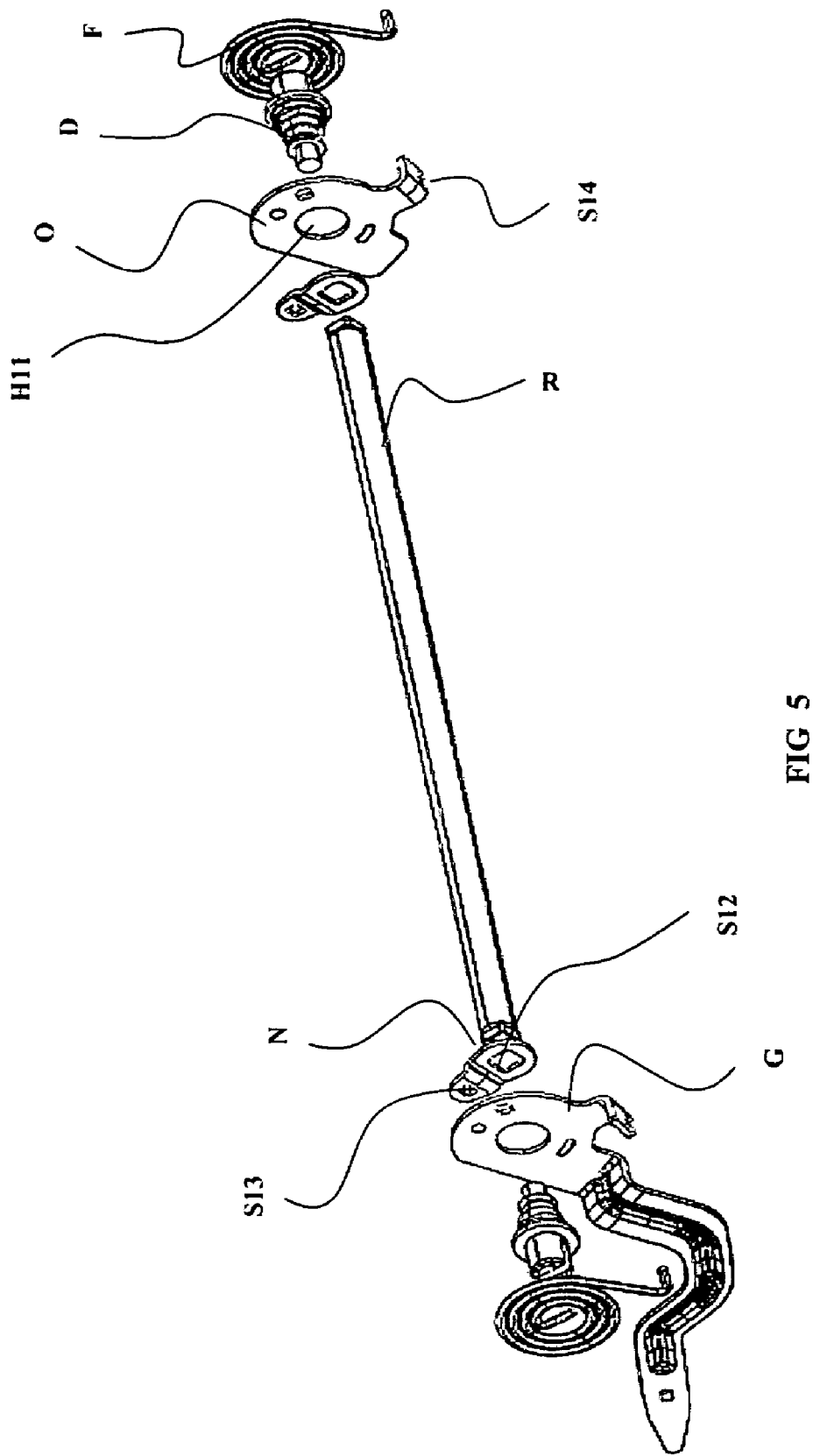
FIG. 5 is another exploded view of the twin recliner assembly.

Now by referring to FIGS. 4 and 5 an end washer M is mounted of step 8 of the shaft arm member D in proximity to the upper housing L by means of its circular opening H10 to protect the upper housing L from getting staked. This helps in the free rotation of the upper housing L with respect to the shaft arm D. The push through P7 gives clearance between the end washer M and upper housing L.

A projection B2 disposed on the side facing the upper housing L passes through the opening H6 on the guide plate K and slot S9 on the upper part L and connects to the connecting bracket N. The cam plate J is mounted on the shaft arm D through the hole H4. The push throughs P4 helps to connect the cam plate J with the guide plate K. The cam plate is mounted in such a way that the lower profiles of the three inner sectors I1, I2 and I3 are in contact with the three corners of the cam plate. When the lever release G is operated the cam plate rotates and helps in disengagement of the inner sectors with the upper part L and thus unlocks the Master recliner assembly. The same effect is transferred to the slave assembly 2 (FIG. 2) through the connecting bracket N which is actuated by the bend B2 on the cam plate. Again when the effort on the lever release G is released the cam plate rotates in the opposite direction and thus pushing the inner sectors for engagement with the upper part and locking the recliner assembly.

The upper part L forms the housing on the inner side for the inner sectors (I), cam plate J and guide plate K. It also act as a mounting member for the recliner assembly which has to be mounted on the seat back B, with the help of holes H9. The push throughs P6 and slots S10 and S11 helps for location of the upper support plate P. Hole H8 helps in mounting of the upper part onto the shaft arm D. Slot S9 guides the bend B2 of the cam plate J. The gear profile of the upper housing L meshes or unmeshes with the gear profile of the inner sectors and thus helping in locking or unlocking of the recliner assembly.

The end washer M protects the upper part L from getting staked. This helps in the free rotation of the upper part L with respect to the shaft arm D. The opening H10 mounts the end washer on to the shaft arm D. The push through P7 gives clearance between the end washer M and upper part L.

The connecting bracket N helps in transferring the motion from Master recliner to the slave recliner. One of the openings H12 is used to mount the connecting rod R and the other opening H13 mounts the bend B2 of the cam plate J.

The lower support plate Q acts as a supporting member and is attached to the lower part H. The holes H15 help in locating and holes H14 help in mounting the lower support plate Q on to the lower part H.

Now by referring to FIGS. 4 and 5, a slave recliner 2 having a bracket release O instead of lever release G of the Master recliner 1 to hook the spring lever F and without a spring return. The bracket release O is mounted on the Shaft arm D through the hole H11, and the slot S14 helps in hooking the spring lever T of the slave recliner.

The connecting rod R connects the Master and the Slave recliner and helps in transferring the motion from Master to slave recliner for locking and unlocking of the recliner assembly. It is mounted on to the shaft arm D on the stepping arrangement 10 and holds the connecting bracket N on each side through the slot S12. The slave recliner assembly confers as the load-sharing member and permits a very superior reclining comfort uniformly across the entire seat frame. The operation of the slave recliner is cognate to that of the master recliner except for the actuating mechanism.

The component parts of recliner assembly 2 are mirror image of respective component parts of recliner assembly 1 and operate identically, expect that a lever release G is present in assembly 1 (master side) only and a bracket release O is present with assembly 2 (slave side) only and spring return E is absent in assembly 2 (slave side).

The following embodiments describe the operational aspects of the twin recliner.

In an embodiment of the present invention the said twin recliner comprising:
- (a) a master and a slave recliner disposed on either side of the seat assembly,
- (b) said master recliner further including a lower and a rotatable upper housing to be arranged on a seat cushion and seat back respectively,
- (c) a shaft arm member with a longitudinal cleavage on one side and a plurality of peripheral stepping arrangement on the other side, said shaft arm member axially disposed between the lower and upper housing of the master recliner,
- (d) a movable actuating lever with a web having a central passage engaged at right angle on to the first of the plurality of stepping arrangement of the shaft member,
- (e) an external spring means with one end hooked to the lower portion of the activating lever and the other end locked to the longitudinal cleavage of the shaft to facilitate a nominal return rate of the actuating lever,
- (f) the lower housing having a central passage and a teeth profile on its inner surface mounted on the second of said plurality of stepping arrangement of the shaft member,
- (g) an upper supporting plate with a projection locking means mounted on said lower housing,
- (h) an external spring return means with one end locked to the longitudinal cleavage of the shaft arm member and the other end hooked to the locking means of the upper supporting plate, to facilitate a nominal return rate of the seat back,
- (i) plurality of axial recesses on the inner surface of the lower housing,
- (j) plurality of inner sectors having a teeth profile on their outer surfaces disposed in the recesses,
- (k) a rotatable cam mounted on the third of said plurality of stepping arrangement having a projection is engaged with the slot of the lower housing to receive a rotary drive directly from the actuating lever to disengage and engage inner sectors,
- (l) a guiding plate with a central passage mounted on the fourth of the stepping arrangement of the shaft member to provide a synchronized movement of the inner sectors,
- (m) the upper housing having a circular gear to provide locking means for the teeth profile inner sectors with a central passage mounted on the fifth of the stepping arrangement of the shaft member, and
- (n) said slave recliner having a mirror image components of the master recliner except the actuating lever, is in flow communication with the master recliner by means of a connecting rod to receive the corresponding drive from the master recliner.

The shaft arm member of the recliner is a non-rotatable.

The movable actuating lever is used as actuating means to permit an effort less selective position of a seat back with respect to the seat cushion through a range of reclined positions to a selected use position.

A connecting rod with a bracket connects the master and slave recliner of the twin-recliner to effects the transfer of synchronized drive from the master to slave recliner. The recesses of the twin-recliner are arranged in the inner surface of the lower housing to provide a distortion free movement to the inner sectors.

The accession or debacle of a twin recliner assembly solely depends on the actuating mechanism necessary for both the recliner assemblies to work in tandem. In the twin recliner assembly when the lever release of the Master recliner is operated, the cam plate is actuated which in turn actuates the inner sectors, guide plate and the connecting bracket attached to the connecting rod. The same actuation is simulated in the slave recliner by the connecting bracket attached to the connecting rod on the other end and thus producing a simultaneous reclining operation. This operation disengages the inner sectors and the upper housing allows the seat back to be reclined at the desired position. Once the operating force on the lever release is removed, it springs back to initial position due to spring lever and thus locks the backrest in the new position by bringing the inner sectors and the upper housing in mesh.

This unique assembly improves the load carrying capacity and improves the fatigue life. Also the effort required for operating the twin recliner with the unique cable arrangement substantially reduces the operating effort required.

The invention claimed is:

1. A fail-safe twin-recliner for automotive seats, said twin recliner comprising:
    a. a master and a slave recliner disposed on either side of the seat assembly,
    b. said master recliner further including a lower and a rotatable upper housing to be arranged on a seat cushion and seat back respectively,
    c. a shaft arm member with a longitudinal cleavage on one side and a plurality of peripheral stepping arrangement on the other side, said shaft arm member axially disposed between the lower and upper housing of the master recliner,
    d. a movable actuating lever with a web having a central passage engaged at right angle on to the first of the plurality of stepping arrangement of the shaft member,
    e. an external spring means with one end hooked to the lower portion of the activating lever and the other end locked to the longitudinal cleavage of the shaft to facilitate a nominal return rate of the actuating lever, f. the lower housing having a central passage and a teeth profile on its inner surface mounted on the second of said plurality of stepping arrangement of the shaft member, g. an upper supporting plate with a projection locking means mounted on said lower housing, h. an external spring return means with one end locked to the longitudinal cleavage of the shaft arm member and the other end hooked to the locking means of the upper supporting plate, to facilitate a nominal return rate of the seat back, i. plurality of axial recesses on the inner surface of the lower housing, j. plurality of inner sectors having a teeth profile on their outer surfaces disposed in the recesses, k. a rotatable cam mounted on the third of said plurality of stepping arrangement having a projection is engaged with the slot of the lower housing to receive a rotary drive directly from the actuating lever to disengage and engage inner sectors, l. a guiding plate with a central passage mounted on the fourth of the stepping arrangement of the shaft member to provide a synchronized movement of the inner sectors, m. the upper housing having a circular gear to provide locking means for the teeth profile inner sectors with a central passage mounted on the fifth of the stepping arrangement of the shaft member, and n. said slave recliner having a mirror image components of the master recliner except the actuating lever, is in flow communication with the master recliner by means of a connecting rod to receive the corresponding drive from the master recliner.

2. The twin-recliner of claim 1, wherein the shaft arm member is a non-rotatable.

3. The twin-recliner of claim 1, wherein the movable actuating lever is used as actuating means to permit an effort less selective position of a seat back with respect to the seat cushion through a range of reclined positions to a selected use position.

4. The twin-recliner of claim 1, wherein a connecting rod with a bracket connects the master and slave recliner to effect the transfer of synchronized drive from the master to slave recliner.

5. The twin-recliner of claim 1, wherein the recesses are arranged in the inner surface of the lower housing to provide a distortion free movement to the inner sectors.

* * * * *